United States Patent
Specht et al.

(10) Patent No.: US 12,372,155 B2
(45) Date of Patent: Jul. 29, 2025

(54) RADIAL SHAFT SEAL RING

(71) Applicant: BRUSS SEALING SYSTEMS GMBH, Hoisdorf (DE)

(72) Inventors: Jan Specht, Hamburg (DE); Sebastian Teuscher, Hamburg (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 18/520,674

(22) Filed: Nov. 28, 2023

(65) Prior Publication Data
US 2024/0183447 A1 Jun. 6, 2024

(30) Foreign Application Priority Data
Dec. 1, 2022 (DE) .................. 10 2022 131 876.1

(51) Int. Cl.
*F16J 15/3232* (2016.01)

(52) U.S. Cl.
CPC .................. *F16J 15/3232* (2013.01)

(58) Field of Classification Search
CPC .... F16J 15/00; F16J 15/16; F16J 15/50; F16J 15/52; F16J 15/3204; F16J 15/3208; F16J 15/3212; F16J 15/3216; F16J 15/322; F16J 15/3248; F16J 15/3252
USPC .......................................................... 277/562
See application file for complete search history.

(56) References Cited

U.S. PATENT DOCUMENTS

| | | | |
|---|---|---|---|
| 3,973,781 A | 10/1976 | Grörich | |
| 5,326,112 A | 7/1994 | Paykin | |
| 5,711,534 A | 1/1998 | Bengoa et al. | |
| 9,702,463 B2 | 7/2017 | Ikebukuro et al. | |
| 2003/0085527 A1 | 5/2003 | Hacker et al. | |
| 2003/0230852 A1 | 12/2003 | Bengoa et al. | |
| 2007/0187902 A1* | 8/2007 | Kurosawa | F16J 15/3232 277/551 |
| 2011/0018209 A1* | 1/2011 | Dahlhaus-Preussler | D06F 37/00 277/562 |
| 2014/0054864 A1* | 2/2014 | Kohl | F16J 15/3232 277/549 |
| 2014/0353924 A1* | 12/2014 | Epshetsky | F16J 15/328 29/402.08 |
| 2015/0035236 A1* | 2/2015 | Tsuda | F16J 15/3204 525/228 |

(Continued)

FOREIGN PATENT DOCUMENTS

| | | | | |
|---|---|---|---|---|
| DE | 44 43 422 A1 | 6/1996 | | |
| DE | 10154789 A1 * | 5/2003 | ........... | A61B 5/7475 |

(Continued)

*Primary Examiner* — Nathan Cumar
(74) *Attorney, Agent, or Firm* — SALIWANCHIK, LLOYD & EISENSCHENK

(57) ABSTRACT

A radial shaft seal ring having a supporting body and connected to the supporting body a sealing element with a flexible sealing lip, which comprises a contact area for sealingly contacting a shaft, wherein in the contact area of the sealing lip a sealing edge, a plurality of circumferentially sinusoidal closed-loop, arranged in phase with one another and sinusoidal back-feeding channels formed between the swirl ribs are provided in the contact area of the sealing lip, wherein the radial shaft seal ring comprises a ring coil spring which is arranged on the side of the sealing lip opposite the contact area in order to exert a force directed radially inwards on the sealing lip.

10 Claims, 1 Drawing Sheet

(56) References Cited

U.S. PATENT DOCUMENTS

| | | | | |
|---|---|---|---|---|
| 2015/0219220 A1* | 8/2015 | Berdichevsky | ........ | F16J 15/164 |
| | | | | 277/554 |
| 2016/0116067 A1* | 4/2016 | Kamemura | .......... | F16J 15/3204 |
| | | | | 277/559 |
| 2016/0146351 A1* | 5/2016 | Janian | .................. | F16J 15/3228 |
| | | | | 277/560 |
| 2016/0348789 A1* | 12/2016 | Ikebukuro | ............ | F16J 15/3232 |

FOREIGN PATENT DOCUMENTS

| | | |
|---|---|---|
| DE | 102 22 418 A1 | 12/2003 |
| GB | 499480 A | 1/1939 |
| JP | S49-108461 A | 10/1974 |
| JP | 2000-329237 A | 11/2000 |

* cited by examiner

RADIAL SHAFT SEAL RING

CROSS-REFERENCE TO RELATED APPLICATION

This application claims priority to German Patent Application No. 10 2022 131 876.1, filed on Dec. 1, 2022; which is incorporated in its entirety herein.

FIELD OF THE INVENTION

The present invention relates to a radial shaft seal ring having a supporting body and a flexible sealing lip which is attached to the supporting body and comprises a contact area for sealing contact with a shaft, wherein the contact area of the sealing lip comprises a sealing edge, a plurality of swirl ribs which circulate endlessly in a sinusoidal manner in the circumferential direction and are arranged in phase with one another, and sinusoidal back-feeding channels formed between the swirl ribs.

BACKGROUND OF THE INVENTION

Radial shaft seal rings with a ring coil spring on the side of the sealing lip facing away from the shaft and sinusoidal swirl ribs of the same amplitude and phase, but phase-shifted against each other, in the area of contact with the shaft are known from DE 44 43 422 A1 and DE 102 22 418 A1. By means of the sinusoidal swirl ribs, dynamic sealing is achieved in both directions of rotation of the shaft.

A radial shaft seal ring of the type mentioned above is known, for example, from DE 101 54 789 A1. This design also comprises sinusoidal swirl ribs, but omits the conventional ring coil spring in order to avoid a number of associated disadvantages.

BRIEF SUMMARY

The task of the invention is to provide a radial shaft seal ring that seals dynamically in both directions of rotation of the shaft, with which an improved sealing function, a reduced frictional torque as well as a higher robustness against foreign particles, a higher negative pressure capability and wading capability are achieved.

The invention solves this problem with the features of the independent claims. According to the invention, the radial shaft seal ring comprises a ring coil spring which is arranged on the side of the sealing lip opposite the contact area in order to exert a radially inwardly directed force on the sealing lip. The ring coil spring according to the invention ensures a consistently high contact force of the sealing lip on the shaft over the entire service life of the radial shaft seal ring. The invention also achieves greater robustness against foreign particles because, due to the higher contact force, the sealing lip is not separated from the shaft by foreign particles as easily as without a ring coil spring. Other advantages include higher negative pressure resistance and higher wading capacity of a motor vehicle equipped with a sealing arrangement according to the invention.

DETAILED DESCRIPTION

The value of the invention lies in the combination of a flat support of the sealing lip with bidirectional sinusoidal swirl structure, as in DE 101 54 789 A1, with spring loading by the ring coil spring and the advantages that can be achieved as a result, such as higher negative pressure resistance. Based on DE 101 54 789 A1, the use of a ring coil spring is quite surprising because the advantage of the springless sealing lip described there, namely lower frictional power, is at least partially given up again in favor of increased robustness.

Preferably, in the assembled state of the radial shaft seal ring, at least two, preferably at least three, swirl ribs come into contact with the shaft in addition to the sealing edge. Compared with conventional radial shaft seals with ring coil spring, this considerably increases the axial length of the contact area of the sealing lip with the shaft, which means that the surface pressure and the associated wear can be reduced; further advantages are a more robust function, and the use of shafts with lower hardness is possible. Preferably, the ratio $L/l$ of axial length $L$ of the contact area of the sealing lip with the shaft and axial distance $l$ between two back-feeding channels is at least 2.0. In a practical embodiment, the axial length $L$ of the contact area of the sealing lip with the shaft is advantageously greater than 1.1 mm, preferably greater than 1.2 mm, further preferably greater than 1.3 mm, still further preferably greater than 1.4 mm.

Preferably, the ratio $R/l$ of radius $R$ of the sealing edge and axial distance $l$ of two back-feeding channels is at least 0.25, preferably at least 0.30, further preferably at least 0.35, still further preferably at least 0.40. In a practical embodiment, the radius $R$ of the sealing edge is advantageously at least 0.15 mm, preferably at least 0.2 mm. Due to the considerably larger radius of the sealing edge compared to conventional radial shaft seal rings with ring coil spring, an oil film forms under the circumferentially contacting sealing edge or in the contact area during dynamic operation. This causes a significant reduction in the frictional torque.

The clear opening angle of the sealing lip measured from the sealing edge to the ambient side is advantageously less than 10°, preferably less than 8°, further preferably less than 6°, still further preferably less than 5°. Due to the flatter air or opening angle, the back-feeding function of the sinusoidal feeding structure or back-feeding channels is improved, so that modern oils for e-transmissions can also be sealed robustly.

The invention also relates to a sealing arrangement comprising a housing and a rotatable shaft extending within the housing, wherein a radial shaft seal ring as previously described is inserted into a bore in the housing to seal the shaft.

BRIEF DESCRIPTION OF THE FIGURES

The invention will be explained below with reference to preferred embodiments with reference to the accompanying figures. Thereby shows FIG. 1 a cross-section through a radial shaft seal ring according to the invention.

Figure 1:
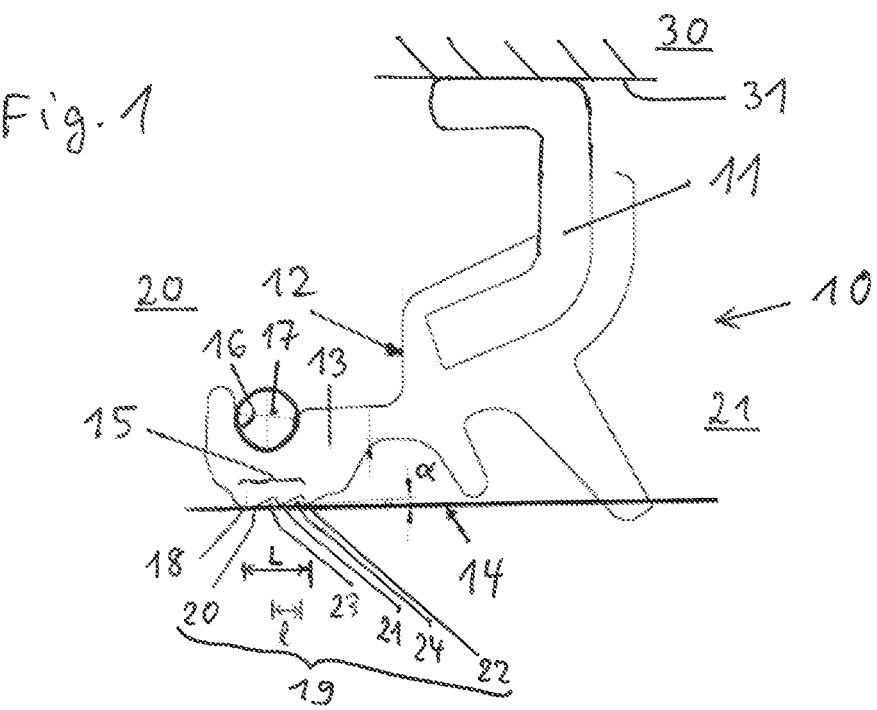

The radial shaft seal ring 10 comprises an annular, for example metallic, supporting body 11 and, attached thereto, a sealing element 12 with a sealing lip 13, which is adapted for sealing contact with the cylindrical surface of a rotating shaft 14. The supporting body 11 is adapted to be press-fitted or otherwise secured in a bore 31 in a housing 30, for example a gearbox housing for an electric motor, and serves to seal an interior 20 of the housing 30 from the environment 21.

The radially inner area of the sealing lip 13, which comes into sealing contact with the shaft 14 in the assembled state of the radial shaft seal ring 10, is referred to as the contact area 15. On the radially outer side opposite the contact area 15, the sealing lip 13 comprises an annular groove 16 in which a ring coil spring 17 is inserted. The ring coil spring 17 serves to press the sealing lip 13 against the shaft 14 in the assembled state of the radial shaft seal ring 10.

Figure 3:
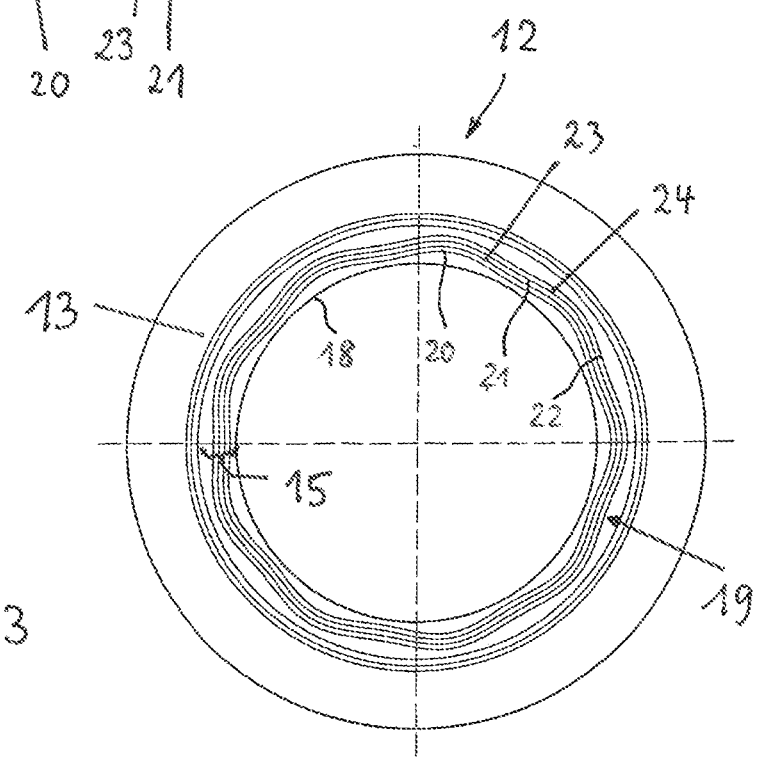
FIG. 3 a front view of a radial shaft seal ring according to the invention in the unassembled state.

On the contact side, i.e., in the contact area 15 of the sealing lip 13, a distal sealing edge 18 and, adjoining this in the proximal direction, a back-feeding structure 19 in the form of circumferential, closed-loop swirl webs 20, 21, 22 and circumferential, closed-loop back-feeding channels 23, 24 arranged therebetween are provided, see FIG. 3. Distal and proximal here refer to the connection of the sealing lip 13 to the supporting body 11. The distal end of the sealing lip 13 is thus the free end, and the proximal end of the sealing lip 13 is the end connected to the supporting body 11. The most distal return channel 20 runs into the sealing edge 18 at some circumferential positions, as shown in FIG. 3.

The swirl webs 20, 21, 22 and the back-feeding channels 23, 24 are sinusoidal, i.e., have a circumferentially sinusoidal course, wherein a whole number of wavelengths, for example nine in FIG. 3, are arranged along the circumference of the sealing lip 13. Due to the sinusoidal course of the back-feeding structure 19, the swirl webs 20, 21, 22 exert back-feeding forces on oil particles in both directions of rotation of the shaft 14 in the direction of the interior space 20 to be sealed (to the left in FIG. 1). The swirl rips 20-22 and the back-feeding channels 23, 24 are arranged in phase with each other, i.e., the maxima and minima of the sine wave are at the same circumferential positions. This arrangement is much more efficient than the inversely phased arrangement of DE 44 43 422 A1 or DE 102 22 418 A1.

The axial length L of the contact area 15 of the sealing lip 13 in the assembled state is defined by the sealing edge 18 and the swirl web 22 furthest away from it and still contacting the shaft 14, see FIG. 1. The axial distance l between two back-feeding channels 23, 24 is also shown in FIG. 1. In a practical embodiment, for example, the axial distance l is about 0.5 mm.

The ring coil spring 17 according to the invention results in about one more swirl web 22 coming into contact with the shaft 14 on the ambient side 21 than would be the case without the ring coil spring 17. The ring coil spring 17 thus advantageously increases the axial contact surface L.

Compared with conventional radial shaft seal rings with ring coil spring 17, for example according to DE 44 43 422 A1 or DE 102 22 418 A1, the axial length L is considerably greater, which means that the surface pressure and thus the wear of the sealing lip 13 in the contact area 15 can be reduced. The ratio L/l, i.e., the axial length L relative to the axial distance l, is in particular at least 0.25, preferably at least 0.30, further preferably at least 0.35, still further preferably at least 0.40. The axial length L of the contact area of the sealing lip is preferably greater than 1.1 mm, preferably greater than 1.2 mm, further preferably greater than 1.3 mm, still further preferably greater than 1.4 mm and is, for example, about 1.5 mm.

The radius R of the sealing edge 18 (see FIG. 2) is advantageously at least 0.15 mm, preferably at least 0.2 mm. Preferably, the ratio R/l of radius R of the sealing edge 18 and axial distance l of two back-feeding channels 23, 24 is at least 0.25, preferably at least 0.30, further preferably at least 0.35, still further preferably at least 0.40. Due to the considerably larger radius R of the sealing edge 18 compared to conventional radial shaft seal rings with ring coil spring, an oil film forms under the circumferentially contacting sealing edge or in the contact area during dynamic operation. This causes a significant reduction in the frictional torque.

Figure 2:
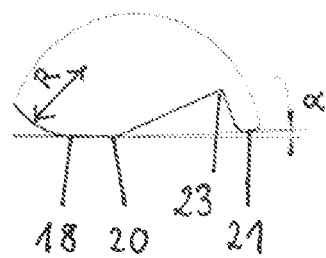
FIG. 2 an enlarged view of the radial shaft seal ring according to FIG. 1 in the region of the sealing edge.

The air angle or clear opening angle α of the sealing lip 13 in the assembled state is the clear opening angle starting from the outermost contact point on the ambient side, formed in FIG. 2 by the swirl web 20, towards the ambient side 21. The illustration in FIG. 2 is for explanatory purposes only; in reality, the outermost ambient-side contact point is more likely to be formed by the swirl web 21, 22, . . . . The clear opening angle α of the sealing lip 13 in the assembled state is advantageously less than 10°, preferably less than 8°, further preferably less than 6°, still further preferably less than 5°. The clear opening angle α of the sealing lip 13 according to the invention is thus considerably smaller compared with a conventional radial shaft seal ring with ring coil spring 17, for example according to DE 44 43 422 A1 or DE 102 22 418 A1, with an air angle of around 20°. The flatter air or opening angle improves the return function of the sinusoidal conveying structure or back-feeding channels, so that modern oils for e-transmissions can also be sealed robustly.

The invention claimed is:

1. A radial shaft seal ring having a supporting body and connected to the supporting body a sealing element with a flexible sealing lip, which comprises a contact area for sealing contact with a shaft, wherein a sealing edge, a plurality of circumferentially sinusoidal, closed loop swirl ribs arranged in phase with one another, and sinusoidal back-feeding channels formed between the swirl ribs are provided in the contact area of the sealing lip, wherein the radial shaft sealing ring comprises a ring coil spring which is arranged on the side of the sealing lip opposite the contact area in order to exert a radially inwardly directed force on the sealing lip; wherein the ratio R/l of radius R of the sealing edge and axial distance l of two back-feeding channels is at least 0.25; wherein the ratio L/l of axial length L of the contact area of the sealing lip and axial distance l of two back-feeding channels is at least 2.0; wherein a clear opening angle α of the sealing lip from the contact area towards the ambient side is less than 10°; wherein the radius R of the sealing edge is at least 0.15 mm; and wherein the axial length L of the contact area of the sealing lip is greater than 1.1 mm.

2. The radial shaft seal ring according to claim 1, wherein the assembled state, in addition to the sealing edge, at least two swirl ribs also come into contact with the shaft.

3. The radial shaft seal ring according to claim 2, wherein the assembled state, in addition to the sealing edge at least three swirl ribs also come into contact with the shaft.

4. A sealing arrangement comprising a housing and a rotatable shaft extending in the housing, wherein a radial shaft seal ring according to claim 1 is inserted in a bore in the housing for sealing the shaft.

5. The radial shaft seal ring according to claim 1, wherein the ratio R/l of radius R of the sealing edge and axial distance l of two back-feeding channels is at least 0.40.

6. The radial shaft seal ring according to claim 1, wherein the clear opening angle α of the sealing lip from the contact area towards the ambient side is less than 5°.

7. The radial shaft seal ring according to claim 1, wherein the radius R of the sealing edge is at least 0.2 mm.

8. The radial shaft seal ring according to claim 1, wherein the axial length L of the contact area of the sealing lip is greater than 1.4 mm.

9. A radial shaft seal ring having a supporting body and connected to the supporting body a sealing element with a flexible sealing lip, which comprises a contact area for sealing contact with a shaft, wherein a sealing edge, a plurality of circumferentially sinusoidal, closed loop swirl ribs arranged in phase with one another, and sinusoidal back-feeding channels formed between the swirl ribs are provided in the contact area of the sealing lip, wherein the radial shaft sealing ring comprises a ring coil spring which is arranged on the side of the sealing lip opposite the contact area in order to exert a radially inwardly directed force on the sealing lip; wherein the ratio $R/l$ of radius $R$ of the sealing edge and axial distance $l$ of two back-feeding channels is at least 0.40; wherein the ratio $L/l$ of axial length $L$ of the contact area of the sealing lip and axial distance $l$ of two back-feeding channels is at least 2.0; wherein a clear opening angle $\alpha$ of the sealing lip from the contact area towards the ambient side is less than 5°; wherein the radius $R$ of the sealing edge is at least 0.2 mm; and wherein the axial length $L$ of the contact area of the sealing lip is greater than 1.4 mm.

10. The radial shaft seal ring according to claim 9, wherein the axial distance $l$ is about 0.5 mm; and the axial length $L$ of the contact area of the sealing lip is about 1.5 mm.

\* \* \* \* \*